(12) United States Patent
Ou

(10) Patent No.: US 9,692,852 B2
(45) Date of Patent: Jun. 27, 2017

(54) UPLOADING A FORM ATTACHMENT

(71) Applicant: Alibaba Group Holding Limited, George Town (KY)

(72) Inventor: Xingnan Ou, Hangzhou (CN)

(73) Assignee: Alibaba Group Holding Limited (KY)

( * ) Notice: Subject to any disclaimer, the term of this patent is extended or adjusted under 35 U.S.C. 154(b) by 105 days.

(21) Appl. No.: 14/624,420

(22) Filed: Feb. 17, 2015

(65) Prior Publication Data
US 2015/0237163 A1   Aug. 20, 2015

(30) Foreign Application Priority Data
Feb. 20, 2014   (CN) .......................... 2014 1 0057925

(51) Int. Cl.
*H04L 29/08*   (2006.01)
*H04L 29/06*   (2006.01)

(52) U.S. Cl.
CPC ............ *H04L 67/32* (2013.01); *H04L 63/123* (2013.01); *H04L 67/06* (2013.01); *H04L 67/1097* (2013.01)

(58) Field of Classification Search
CPC ....... H04L 67/32; H04L 67/06; H04L 63/123; H04L 6/1097; H04L 67/1097
USPC .............................................. 726/4; 709/219
See application file for complete search history.

(56) References Cited

U.S. PATENT DOCUMENTS

| 6,859,213 B1 | 2/2005 | Carter |
| 9,165,285 B2 | 10/2015 | Schultz et al. |
| 9,185,065 B2 | 11/2015 | Chakra et al. |
| 9,286,598 B2 * | 3/2016 | Cohen ..................... H04L 67/06 |
| 2003/0105760 A1 | 6/2003 | Sini |
| 2003/0132967 A1 | 7/2003 | Sangadharan |
| 2004/0177159 A1 | 9/2004 | Butterfield et al. |
| 2005/0004987 A1 | 1/2005 | Bangor |
| 2006/0020670 A1 | 1/2006 | Anderson |
| 2007/0106736 A1 | 5/2007 | Shepherd |
| 2009/0254572 A1 * | 10/2009 | Redlich .................. G06Q 10/06 |
| 2011/0219293 A1 | 9/2011 | Maxwell et al. |
| 2012/0278404 A1 | 11/2012 | Meisels et al. |
| 2012/0278407 A1 | 11/2012 | Meisels et al. |
| 2012/0331108 A1 | 12/2012 | Ferdowsi et al. |
| 2013/0187756 A1 * | 7/2013 | Fisher ................ G07C 9/00571 340/5.61 |
| 2014/0297759 A1 | 10/2014 | Mody |

FOREIGN PATENT DOCUMENTS

WO    2013127449    9/2013

* cited by examiner

*Primary Examiner* — Kambiz Zand
*Assistant Examiner* — Benjamin Kaplan
(74) *Attorney, Agent, or Firm* — Van Pelt, Yi & James LLP

(57) ABSTRACT

Embodiments of the present application relate to a method, apparatus, and system for uploading a form attachment file. The method includes receiving, from a second terminal, a request for an attachment upload address. In response to receiving the request for the attachment upload address, sending a form attachment upload address to the second terminal, receiving, from a first terminal, an attachment upload page access request, and receiving a form attachment from the first terminal.

34 Claims, 7 Drawing Sheets

400

UPLOADING A FORM ATTACHMENT

CROSS REFERENCE TO OTHER APPLICATIONS

This application claims priority to People's Republic of China Patent Application No. 201410057925.X entitled A METHOD, A SYSTEM AND A WEB SERVER FOR UPLOADING FORM ATTACHMENTS, filed Feb. 20, 2014 which is incorporated herein by reference for all purposes.

FIELD OF THE INVENTION

The present invention relates to a field of computer application technology. In particular, the present invention relates to a method, a system, and an apparatus, such as a web server, for uploading form attachments.

BACKGROUND OF THE INVENTION

The main function of forms on web pages is to collect data. Users use forms to upload form data or form attachments to web servers. The web servers store the form data or form attachments on file storage servers. Because of the complexity of the forms themselves, the forms are often displayed on a PC terminal (e.g., such as a desktop, a notebook computer, or the like). According to some related art, because of the limitations of computer functions of the PC terminal (e.g., the inability to capture media such as an image, an audio, a video, or the like), other equipment, which has the ability to capture media, is generally required to complete photograph or audio data collection (e.g., the capture and storage of media) in association with the preparation to upload a form attachment such as a media file (e.g., an image, an audio clip, a video clip, or the like). Thereafter, a user is required to connect the other equipment (e.g., that was used to capture the media to be included as a form attachment) to the desktop or notebook computer in order to transfer the media (e.g., the image, the audio, the video, or the like) to the PC terminal in order to enable the PC terminal to upload the media as a form attachment. Thereafter, only after the PC terminal has received, from the other equipment, the media to be used as a form attachment, can the PC terminal complete the upload of the form attachments. In addition, given the rapid development of easy-to-use smart terminal equipment such as smart phones, more and more users are collecting data (e.g., capturing images or audio) with smart terminals. Consequently, demand to upload data such as the data (e.g., the media) collected by the smart terminal as attachments to forms is increasing.

According to some related art, in the event that the data in a smart terminal is uploaded as a form attachment, the smart terminal must first connect with a PC terminal, and the data stored on the smart terminal is uploaded (e.g., as a form attachment) to the PC terminal. Thereafter, the PC terminal stores a local copy of the data, and a user selects the data that is locally stored on the PC terminal and uploads the selected locally stored data to a web server. However, this method of uploading form attachments according to some related art requires the tedious steps of first connecting the smart terminal to a PC terminal, uploading the data for the form attachments to the PC, and then uploading such data from the PC to a web server. In addition, the method of uploading form attachments according to some related art requires the data for the form attachments to be stored locally on a PC terminal. The local storage of data for the form attachments is relatively insecure and involves a risk of data leaks, particularly in the event that the PC terminal is shared by many people or is infected with a virus.

BRIEF DESCRIPTION OF THE DRAWINGS

Various embodiments of the invention are disclosed in the following detailed description and the accompanying drawings.

DETAILED DESCRIPTION

Figure 1:
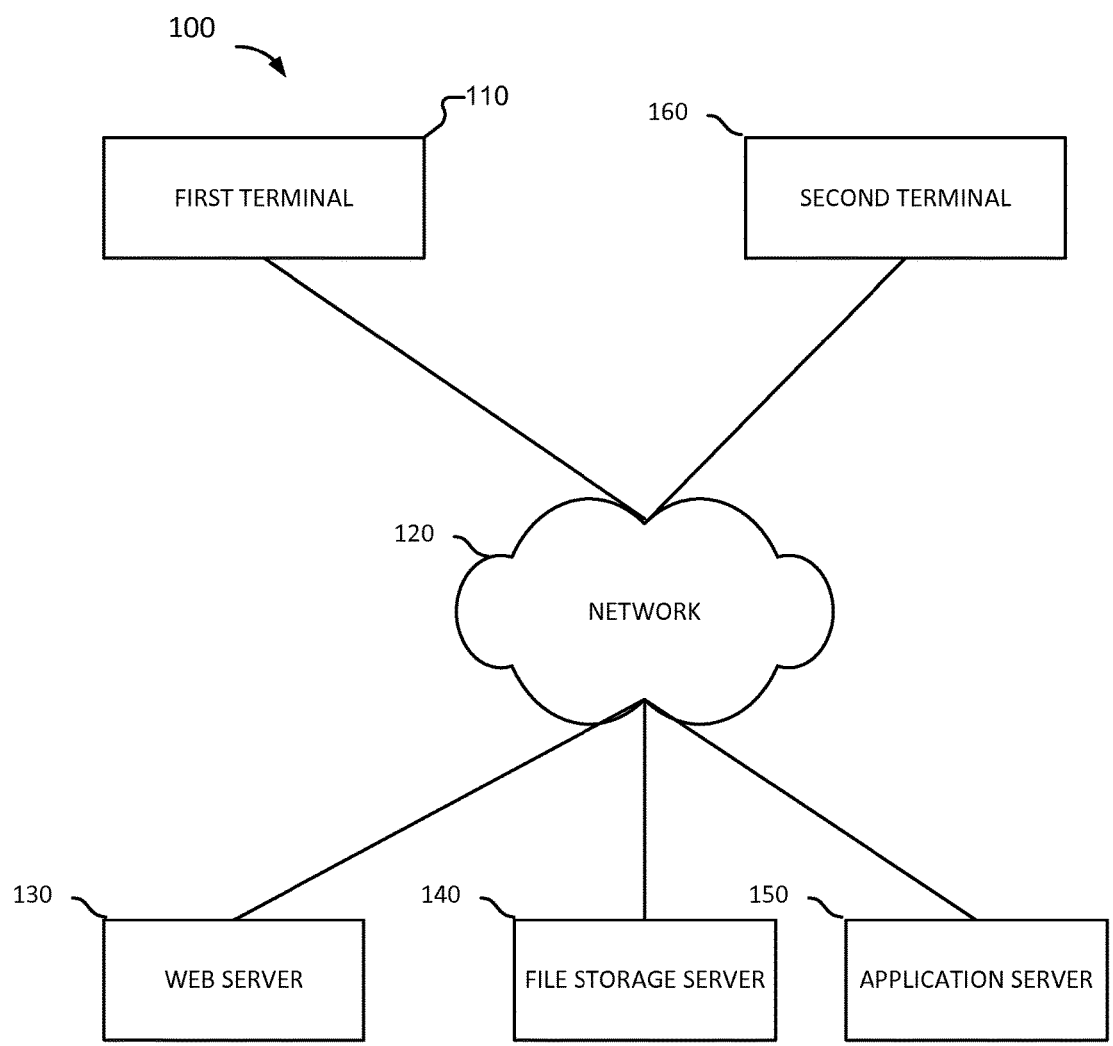
FIG. 1 is an illustration of a system architecture according to various embodiments of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the present disclosure include a method, an apparatus, and a system for uploading a form attachment.

As used herein, a terminal generally refers to a device used (e.g., by a user) within a network system and used to communicate with one or more servers. According to various embodiments of the present disclosure, a terminal includes components that support communication functionality. For example, a terminal can be a smart phone, a tablet device, a mobile phone, a video phone, an e-book reader, a desktop computer, a laptop computer, a netbook computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a smart home appliance, or the like.

According to various embodiments of the present disclosure, a terminal can be any combination of the foregoing devices. In addition, it will be apparent to one having ordinary skill in the art that a terminal according to various embodiments of the present disclosure is not limited to the foregoing devices.

FIG. 1 is an illustration of a system architecture according to various embodiments of the present invention.

Referring to FIG. 1, a system 100 for uploading a form attachment is illustrated. The system 100 for uploading a form attachment includes a first terminal 110, a network 120, and a web server 130. In some embodiments, the system 100 can further include a file storage server 140, an application server 150, the like, or any combination thereof. In some embodiments, the system 100 implements a method for uploading a form attachment, such as the method 200 illustrated in FIG. 2, method 300 illustrated in FIG. 3, and method 400 illustrated in FIG. 4. In some embodiments, the web server 130 is implemented as the web server 500 illustrated in FIG. 5. In some embodiments, each of the first terminal 110, the second terminal 160, the file storage server 140, and the application server 150 can be implemented by a computer system such as the computer system 600 illustrated in FIG. 6.

In some embodiments, the first terminal 110 communicates with the web server 130 over a network 120. In some embodiments, the web server 130 can communicate with the file storage server 140, the application server 150, or the like over a network such as the network 120. The network over which the web server 130 can communicate with the file storage server 140, the application server 150, or the like can be a local area network, a wide area network, the like, or any combination thereof.

In some embodiments, the system 100 includes a second terminal 160. The second terminal 160 can be a personal computer that executes a web browser or a standalone client capable of displaying web pages. In some embodiments, the browser or standalone client is referred to as the PC browser, and the terminal on which the PC browser operates is referred to as the PC browser.

In some embodiments, the first terminal 110 can be a mobile terminal such as a smart terminal. The smart terminal can be, but is not limited to, a smart cell phone, a PDA, a tablet computer, or other such terminal equipment. In some embodiments, first terminal 110 is configured to perform one or more data collection functions. For example, the first terminal 110 includes a camera to capture an image or a video, a microphone to capture audio (e.g., record audio), or any other appropriate hardware/software combination used to capture data in various formats. The first terminal 110 includes a scanner or camera with processing software to capture (e.g., scan) an information code such as a bar code, a QR code, or the like. The first terminal 110 can be configured to include, store, or otherwise communicate identification information (e.g., to enable an identification function).

Figure 2A:
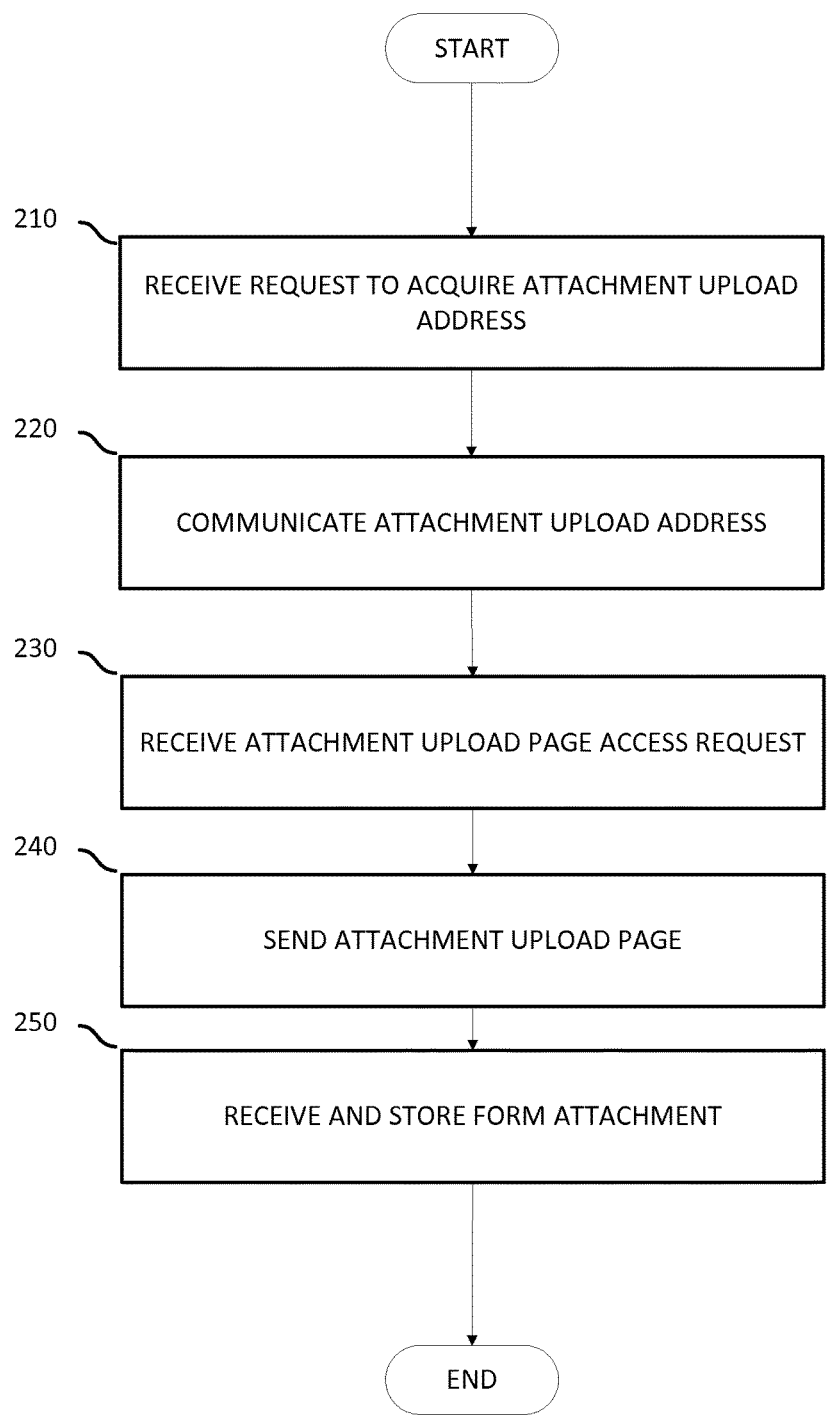
FIG. 2A is a flowchart of a method for uploading a form attachment according to various embodiments of the present invention.

FIG. 2A is a flowchart of a method for uploading a form attachment according to various embodiments of the present invention.

Referring to FIG. 2A, a method 200 for uploading a form attachment is provided. In some embodiments, the method 200 is implemented by a system such as the system 100 illustrated in FIG. 1.

At 210, a request to acquire an attachment upload address is received. In some embodiments, a server receives the request to acquire an attachment upload address. The request to acquire an attachment upload address can be sent by a PC browser running on a device such as the second terminal 160 of FIG. 1 when a user of the PC browser accesses the attachment upload address. In various embodiments, the attachment upload address can be determined as a result of certain browser actions such as clicking on a URL, typing in the address, clicking on a button or the like that leads to the address, etc. In some embodiments, the server is a web server such as the web server 130 illustrated in FIG. 1. An example of a request to acquire an attachment upload address is "http://go-test.1688.com:7100/buyoffer/post_offer.htm."

At 220, a form attachment upload address is communicated. In some embodiments, the server (e.g., a web server such as 130) sends the form attachment upload address to a terminal (e.g., a device executing a browser or other standalone application that initiates the request to acquire an attachment upload address which is received by the server).

In some embodiments, a terminal (e.g., a PC browser device) sends a form page access request to a server (e.g., the web server). The receiving of a form page access request is equivalent to the receiving of a request to acquire a form attachment upload address, from the perspective of the web server. In response to receiving the form page access request (or equivalently, the request to acquire a form attachment upload address), the web server sends the form page to the terminal (e.g., the PC browser device). In addition, the web server can send (e.g., to the terminal) the form attachment upload address corresponding to the form page. For example, in response to receiving the form page access request (e.g., "http://go-test.1688.com:7100/buyoffer/post_offer.htm POST," the web server can send, to the terminal, the form page and the form attachment upload address "http://go-test.1688.com:7100/buyoffer/post_offer.htm" corresponding to the form page. In some embodiments, in the event that the terminal receives the form page and the form attachment upload address corresponding to the form page, the terminal can display the form attachment upload address on the form page.

In some embodiments, the terminal (e.g., the PC browser device) sends a form page access request to a server (e.g., the web server). The server can send a form page to the PC browser. For example, the server can be configured to send the form page to the PC browser in response to receiving a form page access request (e.g., from a terminal). The terminal (or its user) can select, or otherwise trigger, functionality of the form page. For example, the terminal can select a button on the form page. In some embodiments, in response to the terminal triggering the button on the form page, the terminal sends a request to the server to acquire the attachment upload address (e.g., "http://go-test.1688.com:

7100/buyoffer/post_offer.htm") In the event that the server receives a request for the attachment upload address (e.g., an HTTP message such as a GET message, a POST message, the like, or any combination thereof from terminal), the server sends the form attachment upload address to the terminal (e.g., "http://go-test.1688.com:7100/buyoffer/post_offer.htm"). In some embodiments, the terminal can display the form attachment upload address on the form page. For example, in the event that the terminal (e.g., PC browser device) receives the form attachment upload address (e.g., from the server), the terminal can then display the form attachment upload address on the form page.

In some embodiments, the smart terminal (e.g., the first terminal 110) acquires the form attachment upload address from another terminal (e.g., the second terminal 160 such as a PC browser device). The smart terminal uses the form attachment upload address in connection with sending (e.g., to send) an attachment upload page access request to the server (e.g., the web server). For example, the other terminal can send the smart terminal the form attachment upload address over a wireless connection (e.g., WiFi, Bluetooth, NFC, or the like). The other terminal can send the form attachment upload address in a message such as an email, an instant message, a Short Message Service (SMS) message, or the like. As another example, the other terminal can provide the form to the smart terminal via a display such that a user can manually enter the form attachment upload address.

At 230, an attachment upload page access request is received. In some embodiments, the server (e.g., the web server) receives the attachment upload page access request. The attachment upload page access request can be sent (e.g., to the web server) by another terminal (e.g., the smart terminal, such as the first terminal 110 illustrated in FIG. 1). In some embodiments, the smart terminal sends the attachment upload page access request after (e.g., in response to) the smart terminal acquires the form attachment upload address.

At 240, the attachment upload page is communicated. In some embodiments, the server (e.g., the web server) sends the attachment upload page back to the smart terminal. For example, the web server sends the attachment upload page "http://go-test.1688.com:7100/buyoffer/post_offer.htm" back to the smart terminal.

At 250, the form attachment is received and stored. In some embodiments, the server (e.g., the web server) receives and stores the form attachment. The server can receive the form attachment from the smart terminal. In some embodiments, the form attachment can be submitted by the smart terminal via the attachment upload page.

In some embodiments, after the smart terminal obtains the attachment upload page, the smart terminal can use the attachment upload page to upload local files as form attachments to the server (e.g., the web server). For example, the smart terminal can upload local files (e.g., a locally stored photo) as form attachments to the server, in response to receiving the attachment upload page. The form attachment is stored by the server. In some embodiments, a PC browser can associate the form attachment stored by the server with a form information (or information relating thereto) that is subsequently submitted by the PC browser. For example, the browser can populate, with form information, at least a subset of all fields associated with a form, and the PC browser can associate the form attachment stored by the server with the form information.

Figure 2B:
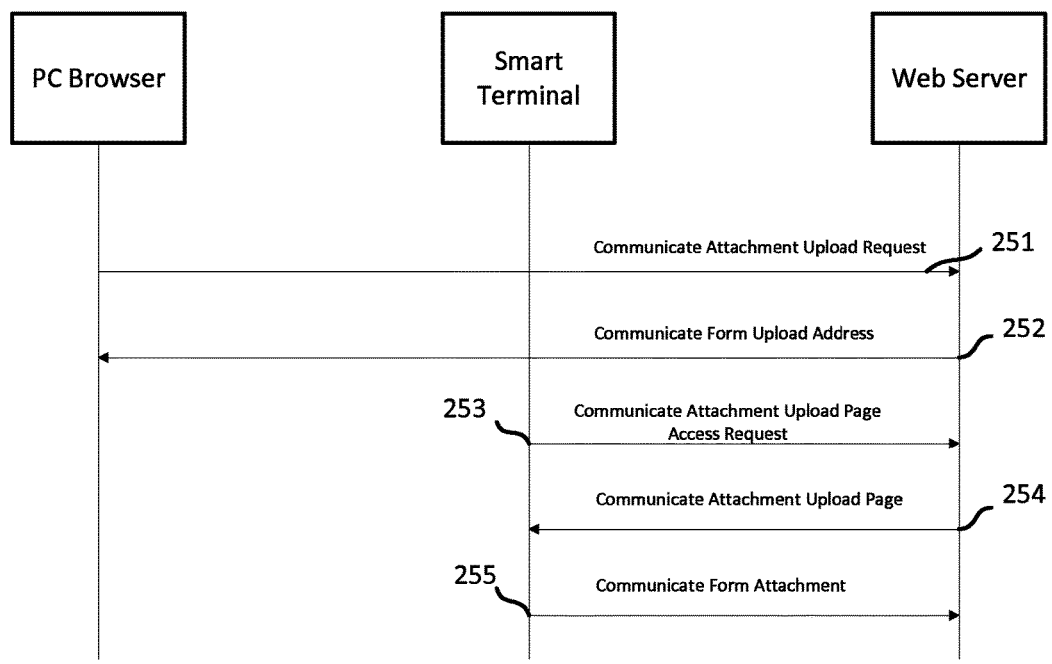
FIG. 2B is a flowchart of a method for uploading a form attachment according to various embodiments of the present invention.

FIG. 2B is a flowchart of a method for uploading a form attachment according to various embodiments of the present invention.

Referring to FIG. 2B, a method 250 for uploading a form attachment is provided. In some embodiments, the method 250 may correspond to method 200 illustrated in FIG. 2A. In some embodiments, the method 250 is implemented by a system such as the system 100 illustrated in FIG. 1.

At 251, an attachment upload request is communicated. In some embodiments, a browser installed on a terminal (e.g., a PC browser device) sends the attachment upload request to a server (e.g., a web server). The server can receive the attachment upload request. An example of an attachment upload request is an HTTP message such as a GET message, a POST message, the like, or any combination thereof. For example, the attachment upload request can be a request for the attachment upload address (e.g., "http://go-test.1688.com:7100/buyoffer/post_offer.htm").

At 252, a form upload address is communicated. In some embodiments, the form upload address is sent to the browser installed on the terminal. The server can send the form upload address. In some embodiments, the server sends the form upload address to the browser installed on the terminal in response to the server receiving the attachment upload request. An example of the form upload address is "http://go-test.1688.com:7100/buyoffer/post_offer.htm".

At 253, an attachment upload page access request is communicated. In some embodiments, a mobile terminal (e.g., the smart terminal) sends the attachment upload page access request to the server. The server can receive the attachment upload page access request. An example of an attachment upload page access request is an HTTP message such as a GET message, a POST message, the like, or any combination thereof. For example, the attachment upload page access request can be a request to access the attachment upload address (e.g., "http://go-test.1688.com:7100/buyoffer/post_offer.htm").

At 254, an attachment upload page is communicated. In some embodiments, the server sends the attachment upload page to the mobile terminal. In some embodiments, the server sends the attachment upload page to the mobile terminal in response to the server receiving attachment upload page access request. An example of an attachment upload page is "http://go-test.1688.com:7100/buyoffer/post_offer.htm."

Figure 3:
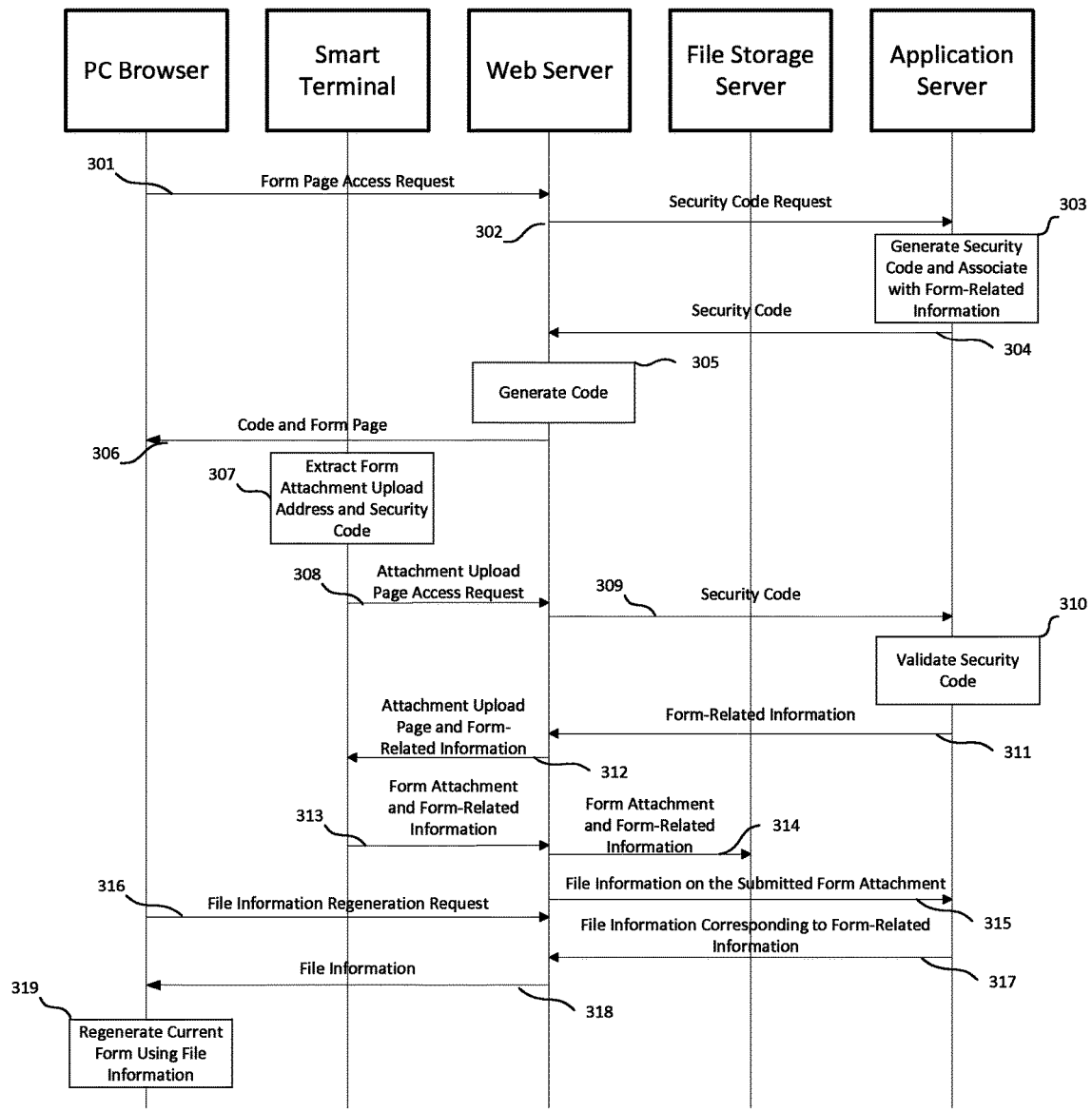
FIG. 3 is a flowchart of a method for uploading a form attachment according to various embodiments of the present invention.

At 255, a form attachment is communicated. In some embodiments, the mobile terminal sends the form attachment to the server. The mobile terminal can use the attachment upload page to communicate the form attachment to the server. For example, the mobile terminal can post a form attachment (e.g., a JPEG file) to the server corresponding to the attachment upload page's URL. FIG. 3 is a flowchart of a method for uploading a form attachment according to various embodiments of the present invention.

Referring to FIG. 3, a method 300 for uploading a form attachment is provided. In some embodiments, the method 300 is implemented by a system such as the system 100 illustrated in FIG. 1.

At 301, a form page access request is communicated. In some embodiments, the server (e.g., the web server) receives the form page access request. The form page access request can be sent by a browser installed on a terminal (e.g., a PC browser installed on a personal computer terminal such as the second terminal 160 illustrated in FIG. 1). The page access request can be generated by the PC browser in response to a user input (e.g., an action performed by the user via a Graphical User Interface (GUI) tool such as clicking a button, selecting a link, etc., using a mouse, a touch screen, or the like).

In some embodiments, in the event that a user opens a form page via a PC browser or seeks access in a subsequent step on an opened form page, the PC browser sends a form page access request to the web server (e.g., such as the web server 130 illustrated in FIG. 1). The form page access request can be an access request that is sent when the form page is first opened (e.g., accessed), or an access request that is sent in a subsequent step on an already opened form page. In some embodiments, the form page access request can correspond to a request that is sent by the PC browser. For example, the PC browser can send the request (e.g., corresponding to the form page access request) to acquire an attachment upload address.

In some embodiments, the request (e.g., the request corresponding to the form page access request) includes form-related information. As an example, the form-related information can include form identifier information, application identifier information, unique identifier information, the like, or any combination thereof. In some embodiments, the form identifier information is used to identify the form in the request. For example, the web server can use the form identifier information to determine the particular form associated with the form page access request. In some embodiments, the form-related information also includes application identifier information for differentiating between specific applications associated with the form. In some embodiments, the unique identifier information is primarily used to identify the upload source of the information. For example, the weber server can use the unique identifier information to determine the upload source of the information. The unique identifier information can correspond to a user identifier, some code information, the like, or any combination thereof. The unique identifier information can be used to differentiate upload sources. In addition, the unique identifier information can also be used to associate form data that is uploaded on the PC (e.g., the PC browser installed on the PC terminal) to one or more form attachments that are uploaded on the smart terminal.

At 302, a security code request is communicated. In some embodiments, the web server communicates the security code request. For example, the web server sends a security code request to the application server. The web server can send the security code request to the application server in response to the web server receiving the form page access request.

In some embodiments, in order to further enhance the security of uploading form attachments, in response to the web server receiving a form page access request, the web server sends a security code request to the application server. In some embodiments, the security code request includes the form-related information described above.

At 303, a security code is generated. In some embodiments, the application server creates the security code. In some embodiments, the application server establishes a mapping relationship between the security code and the form-related information (e.g., the application server associates the security code with the form-related information) and stores the mapping relationship at a storage location for later retrieval.

At 304, the security code is communicated. In some embodiments, the application server sends the security code to the web server. For example, in response to the application server receiving the security code request (e.g., from the web server), the application server generates the security code and sends it to the web server.

The security code can be generated according to various methods. An example of such a method would be to randomly generate a 64-bit character string, using a secure algorithm such as a cryptographic hash function, or other appropriate techniques.

At 305, a code is generated. In some embodiments, the code (e.g., an information code) that is generated is a Quick Response (QR) code. In some embodiments, the web server generates the QR code. In the event that the web server generates the QR code, the web server can send the QR code to the PC browser. In some embodiments, the PC browser generates the QR code. In some embodiments, a function implemented by the browser/client application or a separate application running on the PC browser device is invoked to generate the QR code. In some embodiments, in the event that the PC browser generates the code, the web server sends the security code to the PC browser. The QR code is generated using the form attachment upload address corresponding to the form page (e.g., which the PC browser has requested to open) and the security code. The code can be implemented in various forms such as a bar code, a QR code, a token or certificate, the like, or any combination thereof.

At 306, the generated code and the form page are communicated. For example, in some embodiments, the QR code and the form page that the PC browser has requested to open are sent to the PC browser. For example, an HTTP Post message that includes the form page URL and the QR code as a parameter can be sent to the PC browser.

In some embodiments, after the PC browser receives the form page and the QR code, the PC browser displays the form page and the QR code. In some embodiments, after the PC browser receives the form page and the QR code, the PC browser may communicate the QR code to the smart terminal. For example, the PC browser can display the QR code on the display in order to allow the smart terminal to scan the QR code that is displayed by the display. As another example, the PC browser may reproduce the QR code on a medium (e.g., the PC browser can print the QR code on paper). The medium on which the QR code is reproduced is read by the smart terminal.

At 307, the code is acquired. In some embodiments, the smart terminal acquires the code (e.g., the QR code). For example, after the PC browser receives the form page and the code, the PC browser can display the form page and the code. The smart terminal can acquire the code that is displayed or otherwise communicated by the PC browser. For example, the smart terminal can acquire the code via an image capture function. After the code is acquired, the code is analyzed to obtain the form attachment upload address and the security code. For example, in some embodiments, the smart terminal can extract the form attachment upload address and the security code from the code.

In some embodiments, the content of the code is acquired (e.g., by the smart terminal) by scanning the image representing the code. In response to acquiring the code, the code is analyzed. The smart terminal can obtain or otherwise extract the form attachment upload address and the security code by analyzing the code. In some embodiments, the smart terminal can retrieve or otherwise navigate to the form attachment upload address (e.g., that was obtained or otherwise extracted from the code). For example, the smart terminal can retrieve or otherwise navigate to the form attachment upload address in response to obtaining the form attachment upload address from the code. In response to triggering (e.g., selecting or otherwise executing) the form attachment upload address, the smart terminal requests the web server to open the form attachment upload page.

At 308, an attachment upload page access request is communicated. In some embodiments, the smart terminal sends the attachment upload page access request to the web server. For example, the smart terminal sends the attachment upload page access request in connection to the smart terminal triggering the form attachment upload address. In some embodiments, the smart terminal sends the security code that was extracted from the QR code to the web server. In some embodiments, the attachment upload page access request includes the security code that was extracted from the QR code. In some embodiments, the smart terminal contemporaneously sends the security code and the attachment upload page access to the web server.

At 309, the web server communicates the security code. In some embodiments, the web server receives the attachment upload page access request sent by the smart terminal. In some embodiments, the web server receives the security code sent by the smart terminal. In some embodiments, the attachment upload page request carries the security code. Thus, the attachment upload page request is communicated to the web server in conjunction with the security code. In some embodiments, in response to receiving the upload page access request (and the security code), the web server sends the security code for validation. For example, the web server sends the security code to the application server for validation. The web server can send the security code to the application server in connection with a request for validation of the security code.

At 310, the security code is validated. In some embodiments, the application server validates (e.g., tests) the security code. For example, the received security code that corresponds to the security code extracted from the QR code is compared with the security code that was generated and stored by the application server (e.g., generated and stored by the application server in response to the security code request). In some embodiments, in the event that the security code is validated, form-related information that is mapped to the security code is sent to the web server. For example, if the security code is validated, form-related information associated with the security code is retrieved from its storage location and sent to the web server.

In some embodiments, the validation of the security code conducted by the application server includes testing whether the security code corresponds to an already created security code by looking up the security code in question in a storage storing the application server-created security codes. If the security code is determined to correspond to an already created security code, in other words, the security code is found in the storage, then the security code is deemed validated. If the security code does not correspond to an already created security code, then the security code is not validated. In some embodiments, in order to further ensure security by preventing other users from conducting subsequent uploading of unauthorized attachments using the QR code displayed on the PC browser, the validation of the security code can further comprise determining whether the security code has already been used (e.g., in connection with an attachment upload page access request). In some embodiments, if the security code corresponds to an already created security code and has not been used, then the security code is deemed validated. Otherwise, the security code is not validated. In other words, in some embodiments, when the security code is validated, the fact that the security code has been used will be recorded (e.g., by setting a flag or marker associated with the security code in the storage), and in the event that the security code is used a second time, the security code will not be validated. In some embodiments, a security code may expire after a predefined period of time (e.g., from the time at which the security code was generated).

In some embodiments, in response to validation of the security code, the form-related information associated with (e.g., mapped to) the security code is retrieved. For example, in the event that the security code is validated, the application server searches in a storage for (e.g., query a database storing form-related information) the form-related information that is mapped to the security code.

At 311, form-related information is communicated. In some embodiments, the application server sends the form-related information to the web server. The application server can send the form-related information to the web server in response to the application server validating the security code. The application server can send an indication as to whether the security code is validated (e.g., to the web server). For example, the application server can send the form-related information together with a result of the validation of the security code to the web server. The form-related information is sent in order to associate the form attachment to the form and the form data uploaded by a particular user to the form attachment.

In some embodiments, in the event that the security code is deemed to be invalid (e.g., not validated), the web server sends back a code that corresponds to "erroneous page" to the smart terminal and indicates that the security code was not valid. This process is not shown in FIG. 3.

At 312, an attachment upload page and the form-related information are communicated. In some embodiments, the web server sends the attachment upload page and the form-related information to the smart terminal (e.g., in response to the attachment upload page access request).

In some embodiments, the smart terminal displays the attachment upload page. For example, in response to receiving the attachment upload page, the smart terminal loads the attachment upload page. In some embodiments, smart terminal data is submitted as a form attachment to the web server using relevant operations on the attachment upload page. In some embodiments, a user submits or otherwise inputs the smart terminal data. In some embodiments, form-related information is submitted in conjunction with the smart terminal data.

At 313, the form attachment and form-related information are communicated. In some embodiments, the smart terminal communicates the form attachment (e.g., including or otherwise corresponding to the smart terminal data) and the form-related information. The smart terminal can send the form attachment and the form-related information to the web server. The smart phone can receive an input from a user for selecting a form attachment from a storage operatively connected to the smart phone. For example, the user can select a file stored locally at the smart phone as the form attachment. For example, a photo (e.g., an image file) is sent by the smart terminal server to the web server.

At 314, the web server communicates the form attachment and the form-related information. In some embodiments, the web server receives the form attachment and the form-related information submitted from the smart terminal and thereafter communicates the form attachment and the form-related information. For example, the web server can send the form attachment and the form-related information to a file storage server. As another example, the web server can send the form attachment and the form-related information to the application server (not shown). In some embodiments, the web server submits the form attachment and the form-related information to a storage server for associative storage.

At 315, file information on the form attachment (e.g., that was submitted via the smart phone) is communicated. In some embodiments, the web server sends the file information of the submitted form attachment to the application server.

At 316, a file regeneration request is communicated. In some embodiments, the PC browser sends the file information regeneration request to the web server. The PC browser can send the file information regeneration request in response to a user input. In some embodiments, the file information regeneration request includes the form-related information. For example, the communication of the file regeneration request can correspond to a request for file information (e.g., information relating to the submitted form attachment) that is associated with the form-related information identified in the file regeneration request. An example of a file regeneration request is an html refresh.

In some embodiments, in response to the PC browser opening the form page, the PC browser will start to send the file information regeneration request. The PC browser can send the file information regeneration request using the polling method in order to obtain upload information for the form attachment. For example, in some embodiments, the PC browser can continue to poll (e.g., make request) for corresponding file information after 306 at which the PC browser receives the form page. The PC browser can continue to poll for updates to the form page (or the data associated therewith). In some embodiments, the PC browser sends the file information regeneration request in order to populate the form page.

In some embodiments, the polling method by which the PC browser can send the file information regeneration request includes a JavaScript (JS) polling method. The JS polling method includes polling and sending the file information regeneration request to the web server via JS embedded in the form page.

In some embodiments, the polling method by which the PC browser can send the file information regeneration request can include polling and sending the file information regeneration request to the web server via a plugin, such as a flash plugin or a Java plugin, in the form page.

In some embodiments, the polling method by which the PC browser can send the file information regeneration request can include polling and sending the file information regeneration request by establishing a persistent connection (e.g., a TCP connection) between the PC browser and the web server.

In some embodiments, the JS polling method for sending the file information regeneration request is preferred because of the advantages associated with relatively lower technical cost to carry out (e.g., less processing power is required) and the JS polling method provides a better user experience.

At 317, file information corresponding to the form-related information is communicated. In some embodiments, the web server acquires the file information corresponding to the form-related information from the application server.

At 318, the file information (e.g., associated with the form-related information) is communicated. In some embodiments, the web server sends the acquired file information to the PC browser. For example, the web server can send the file information to the PC browser in response to the file information regeneration request.

At 319, the current form is regenerated. In some embodiments, regeneration of the current form includes populating the form associated with the form page with the corresponding file information. In some embodiments, the PC browser uses the acquired file information to regenerate the current form. For example, the form page can be populated to include the file name of the acquired file and/or the content data of the acquired file.

In some embodiments, in connection with returning the form page, the web server returns a form attachment upload address corresponding to the form page. In various embodiments, the web server can use various methods of providing (e.g., returning) the form attachment upload address corresponding to the form page in addition to the information code method that was described in connection with method 300 above. For example, the web server can send the form attachment upload address directly back to the second terminal (e.g., the PC browser). Thereafter, the second terminal can display the form attachment upload address on the form page via a browser. The first terminal (e.g., the smart terminal) can acquire the form attachment upload address from the second terminal. After the first terminal acquires the form attachment upload address by a method such as user manual input or via image capture, the first terminal sends an attachment upload page access request to the web server.

Figure 4:
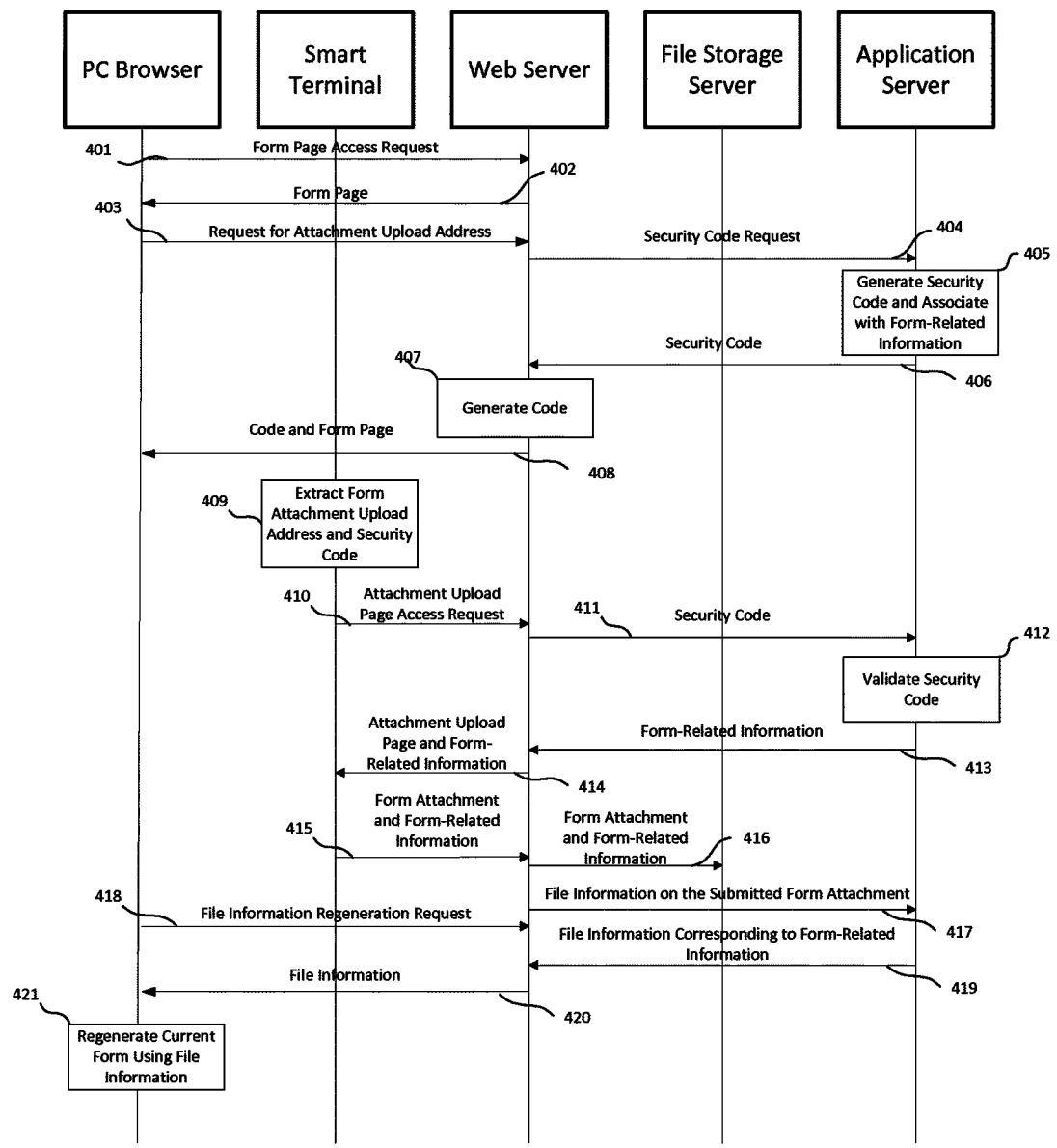
FIG. 4 is a flowchart of a method for uploading a form attachment according to various embodiments of the present invention.

FIG. 4 is a flowchart of a method for uploading a form attachment according to various embodiments of the present invention.

Referring to FIG. 4, a method 400 for uploading a form attachment is provided. In some embodiments, the method 400 is implemented by a system such as the system 100 illustrated in FIG. 1.

At 401, a form page access request is communicated. In some embodiments, the web server receives the form page access request. The form page access request can be sent by a PC browser, an application, the like, or any combination thereof that is installed on a terminal.

In some embodiments, the terminal on which the PC browser is installed sends a form page access request in the event that a user opens a form page via a PC browser, an application stalled on the terminal, or the like, or seeks access in a subsequent step on an opened form page. For example, in some embodiments, the form page access request may be an access request that is sent when the form page is first opened. As another example, in some embodiments, the form page access request may be an access request that is sent in a subsequent step on an already opened form page (e.g., in response to an input to the form page, or the like).

In some embodiments, the form page access request includes form-related information. In some embodiments, the form-related information includes form identifier information, application identifier information, unique identifier information, the like, or any combination thereof. The form identifier information can be used to identify the form in the request. In some embodiments, the form-related information further includes application identifier information for differentiating between specific applications associated with the form. In some embodiments, the unique identifier information is primarily used to identify the upload source of the information. For example, the web server can use the unique identifier information to determine the upload source of the information. The unique identifier information can correspond to a user identifier, some code information, the like, or any combination thereof. The unique identifier information can be used to differentiate upload sources. In addition, the unique identifier information can also be used to associate form data that is uploaded on the terminal (e.g., the PC browser installed on the terminal PC terminal) to one or more form attachments that are uploaded on the smart terminal.

At 402, the form page is communicated. In some embodiments, the web server sends the form page to the PC browser. In some embodiments, the web server sends the form page to the PC browser in response to receiving the page access request.

At 403, a request for an attachment upload address is communicated. In some embodiments, the PC browser sends the request for the attachment upload address to the web server. The PC browser can send the request for the attachment upload address in response to being triggered. The PC browser can be triggered to send the request for the attachment upload address by user input such as a selection of a functionality on the form page (e.g., clicking on a button on the form page, selecting a link on the form page, etc.).

In some embodiments, if the terminal on which the PC browser is installed or the user thereof triggers a function button on the form page associated with acquiring the form attachment upload address, the PC browser will send a request to the web server for the attachment upload address. In some embodiments, the request for the attachment upload address includes form-related information.

Steps 404, 405, and 406 are similar to steps 302, 303, and 304 of the method 300 illustrated in FIG. 3, respectively, and will not be discussed further here.

At 407, a code is generated. In some embodiments, the code that is generated is a QR code. In some embodiments, the web server generates the QR code. In the event that the web server generates the QR code, the web server sends the QR code to the PC browser. In some embodiments, the PC browser (e.g., or the application on which the PC browser is installed) generates the QR code. In some embodiments, in the event that the PC browser generates the code, the web server sends the security code to the PC browser. The QR code can be generated using the form attachment upload address (e.g., which the PC browser has requested) and the security code to generate a QR code. The QR code is sent back to the PC browser. The code can be implemented in various forms such as a bar code, a QR code, a token or certificate, the like, or any combination thereof.

In some embodiments, after the PC browser receives the QR code, the PC browser can display the QR code on the form page or otherwise reproduce the QR code or communicate the QR code to the smart terminal.

Steps 407 through 421 are similar to steps 305 through 319 of the method 300 illustrated in FIG. 3, respectively, and will not be discussed further here.

In some embodiments, the functions of the web server, the file storage server, and the application server or any combination thereof may be integrated on a single server. In some embodiments, the functions of the file storage server or the application server may be implemented by the web server.

Although the process shown in FIG. 4 is different from that of FIG. 3, the example messages involved in individual steps of FIG. 3 are also applicable to the corresponding steps shown in FIG. 4.

Figure 5:
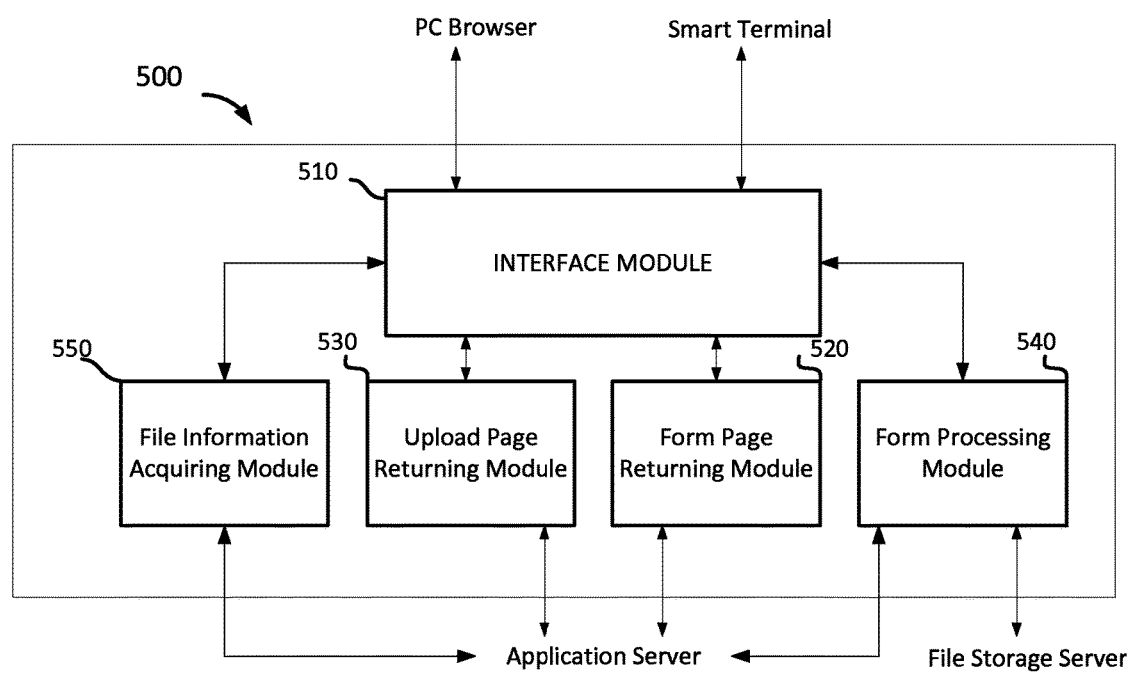
FIG. 5 is a structural diagram of a web server according to various embodiments of the present invention.

FIG. 5 is a structural diagram of a web server according to various embodiments of the present invention.

Referring to FIG. 5, the web server 500 may be implemented as the web server 130 of the system 100 illustrated in FIG. 1. As illustrated in FIG. 5, the web server 500 includes an interface module 510, a form page returning module 520, an upload page returning module 530, and a form processing module 540. In some embodiments, the web server 500 also includes a file information acquiring module 550.

The interface module 510 is configured to exchange data with the PC browser and the smart terminal. The interface module 510 can correspond to a user interface.

The form page returning module 520 sends the form attachment upload address to the PC browser. In some embodiments, the form page returning module 520 sends the form attachment upload address to the PC browser via the interface module 510. The form page returning module 520 can send the form attachment upload address to the PC browser in response to the interface module 510 receiving a request sent by the PC browser to acquire an attachment upload address.

In various embodiments, the form page returning module 520 is configured to send the form attachment upload address according to various implementations.

In some embodiments, the form page returning module 520 sends the form page to the PC browser while also sending back the form attachment upload address corresponding to the form page. For example, the PC browser sends a form page access request to the web server 500. The interface module 510 receives the form page access request from the PC browser. In some embodiments, receiving a form page access request is, for the form page returning module 520, the equivalent of receiving a request to acquire an attachment upload address. In response to the web server 500 receiving the form page access request, the form page returning module 520 sends the form page to the PC browser while also sending back the form attachment upload address corresponding to the form page. Thereafter, the PC browser can display the form attachment upload address on the form page.

In some embodiments, the form page returning module 520 sends the form attachment upload address in response to receiving a request for the attachment upload address from the PC browser. For example, the PC browser sends a form page access request to the web server 500. The interface module 510 receives the form page access request from the PC browser. In response to the interface module 510 receiving the form page access request from the PC browser, the form page returning module 520 sends a form page to the PC browser. Thereafter, in some embodiments, the PC browser can trigger a functionality on the form page (e.g., by a user selecting a button associated with requesting the attachment upload address). For example, by triggering the function button on the form page, the user can cause the PC browser to send a request to the web server 500 to acquire the attachment upload address. The interface module 510 can receive the request for the attachment upload address. In response to the interface module 510 receiving the request for the attachment upload address from the PC browser, the form page returning module 520 sends the form attachment upload address to the PC browser. Thereafter, the PC browser can then display the form attachment upload address on the form page.

In some embodiments, in the event that a user opens a form page via a PC browser or seeks access in a subsequent step on an opened form page, the PC browser can send a form page access request to the web server 500. As an example, in some embodiments, the form page access request corresponds to an access request that is sent when the form page is first opened. As another example, in some embodiments, the form page access request corresponds to an access request sent in a subsequent step on an already opened form page. In some embodiments, the form page access request and the request for an attachment upload address include form-related information. In some embodiments, the form-related information includes form identifier information, application identifier information, unique identifier information, the like, or any combination thereof. In some embodiments, the form identifier information is used to identify the form in the request. The form-related information can also include application identifier information for differentiating between specific applications associated with the form. In some embodiments, the unique identifier information is primarily used to identify the upload source of the information. The unique identifier information can correspond to a user identifier, some code information, the like, or any combination thereof. The unique identifier information can be used to differentiate upload sources. In addition, the unique identifier information can also be used to associate form data that is uploaded on the PC (e.g., the PC browser installed on the PC terminal) to one or more form attachments that are uploaded on the smart terminal (e.g., for the same user).

In some embodiments, in response to the smart terminal acquiring the form attachment upload address, the smart terminal requests that the web server 500 open, or otherwise provide, an upload page for the form attachment. For example, in some embodiments, the smart terminal sends an attachment upload page access request to the web server 500. The interface module 510 can receive the attachment upload page access request.

The upload page returning module 530 sends the attachment upload page to the smart terminal. For example, in response to the web server 500 receiving the attachment upload page access request (e.g., from the smart terminal), the upload page returning module 530 can send the attachment upload page to the smart terminal. The upload page returning module 530 can send the attachment upload page via the interface module 510. In some embodiments, the upload page returning module 530 can send the form-related information together with the attachment upload page to the smart terminal.

In some embodiments, the form page returning module 520 can generate a code (e.g., an information code such as a QR code, a bar code, a token or certificate, or the like). For example, in some embodiments, in connection with the form page returning module 520 sending the form attachment upload address (e.g., to the PC browser), the form page returning module 520 can use the form attachment upload address corresponding to the form page to generate the code and send the code to the PC browser. In some embodiments, the PC browser can reproduce this code such as, for example, by displaying the code on the form page. In some embodiments, the smart terminal acquires the code such as, for example, capturing the code via image capture. The smart terminal can analyze the code and extract the upload address for the form attachment. The smart terminal can trigger (e.g., select or execute) the upload address that the smart terminal extracted from the code. In the event that the smart terminal triggers the upload address, the smart terminal sends the attachment upload page access request (e.g., to the web server 500).

The smart terminal can receive the attachment upload page from the web server 500 (e.g., the interface module 510). In some embodiments, in response to the smart terminal receiving the attachment upload page sent by the web server 500, the smart terminal displays the attachment upload page or otherwise processes the attachment upload page. For example, data (e.g., smart terminal data) can be submitted as a form attachment to the web server 500. In some embodiments, the user performs relevant operations on the attachment upload page to submit the smart terminal data as a form attachment to the web server 500. For example, the user can select or otherwise identify the data to submit to the web server 500 as a form attachment. In some embodiments, the smart terminal submits form-related information submitted in connection with submission of the data to the web server 500.

The form processing module 540 is configured to store the form attachment. For example, the form processing module 540 can store the form attachment in the event that the user interface module 510 receives the form attachment submitted by the smart terminal (e.g., via the attachment upload page). The form processing module 540, while storing the form attachment, can associate the form-related information included with the form attachment and the form attachment. For example, in connection with the storing of the form attachment, the form processing module 540 can associate or otherwise define a relationship between the form-related information included with the form attachment and the form attachment.

In some embodiments, the web server 500 stores form attachments locally. In some embodiments, the web server 500 sends the form attachments to a separate file storage server for storage.

In some embodiments, in order to further improve security, in the event that the form page returning module 520 receives a form page access request (e.g., from the PC browser), the web server (e.g., the form page returning module 520) may acquire a security code that is mapped to, or otherwise associated with, the form-related information. The code (e.g., the information code such as the QR code) can be generated using the form attachment upload address and the security code.

In some embodiments, the web server 500 generates the security code. In some embodiments, the security code is generated by another application server. In some embodiments, in the event that the security code is generated by another application server, the form page returning module 520 sends the form-related information to an application server, receives the security code generated by the application server, wherein the security code has been mapped to the form-related information by the application server.

In some embodiments, the web server 500 can operatively validate a security code included in connection with an attachment upload page access request. For example, the web server 500 can send the security code included in connection with the attachment upload page request to an application server for validation of the security code.

In some embodiments, in the event that the interface module 510 receives the attachment upload page access request, the upload page returning module 530 can acquire the result of a validation of the security code included in the attachment upload page access request. In the event that the security code included in the attachment upload page access request is validated (e.g., matches the originally generated security code), then the upload page returning module 530 can send the form-related information mapped to the security code in conjunction with the attachment upload page to the smart terminal.

In the event that the upload page returning module 530 acquires the result of the validation of the security code performed using the security code included in the attachment upload page access request, the upload page returning module 530 can send the security code included in the attachment upload page access request to the application server and can receive the result of the validation of the security code that is sent back after the application server uses the security code to perform the validation.

In some embodiments, in the event that the security code is validated, the validation of the security code at least includes determining whether the security code corresponds to an already created security code. In the event that the security code corresponds to an already created security code, then the security code can be deemed valid. If the security code does not correspond to an already created security code, then the security code can be deemed not valid (e.g., invalid). In some embodiments, in order to further ensure security by preventing other users from conducting subsequent uploading of unauthorized attachments by scanning the information code displayed on the PC browser, the validation of the security code can also include determining whether the security code has previously been used (e.g., in connection with uploading an attachment). In the event that the security code corresponds to an already created security code and has not previously been used, then the security code can be deemed valid. Otherwise, the security code can be deemed to be not valid (e.g., invalid). In some embodiments, in the event that the security code is validated, the fact that the security code has been used can be recorded. For example, the application server can maintain a record of whether a generated security code has been validated. In some embodiments, if the security code is used a second time (e.g., during a subsequent validation of a security code that has been used), then the security code will not be validated for the use associated with the second time.

In some embodiments, in order to assist users to monitor that the progress of file uploads are progressing and to enhance user experiences, the PC browser may, after opening the form page, start using the polling method to send a file information regeneration request as a method for acquiring form attachment upload information. The PC browser can be provided with a status (e.g., a real-time) of the file upload in response to the file information regeneration request. In some embodiments, the polling method can enable the PC browser to receive information relating to the file upload contemporaneous with the file upload. In some embodiments, in the event that the interface module 510 receives a file information regeneration request sent by the PC browser, the file information acquiring module 550 acquires already stored form attachment file information corresponding to the form-related information included with the file information regeneration request and sends the file information to the PC browser (e.g., via the interface module 510). The PC browser can use the file information to regenerate (e.g., populate) the current form.

In some embodiments, when (e.g., in connection with) the form processing module 540 submits form attachments to the file storage server for storage, the form processing module 540 sends file information on the stored form attachments to the application server. At this point, the file information acquiring module 550 can acquire file information corresponding to the form-related information from the application server.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

In some embodiments, the polling method by which the PC browser can send the file information regeneration request can include a JS polling method. The JS polling method includes polling and sending the file information regeneration request to the web server via JS embedded in the form page.

In some embodiments, the polling method by which the PC browser can send the file information regeneration request can include polling and sending the file information regeneration request to the web server via a plugin, such as a flash plugin or a Java plugin, in the form page.

In some embodiments, the polling method by which the PC browser can send the file information regeneration request can include polling and sending the file information regeneration request by establishing a persistent connection between the PC browser and the web server.

In some embodiments, the JS polling method for sending the file information regeneration request is preferred because of the advantages associated with relatively lower technical cost to carry out (e.g., less processing power is required) and the JS polling method provides a better user experience.

In some embodiments, in the event that a user opens a form page using a PC browser, the form page will display a QR code. If the user wants to upload a page attachment, then the user can scan the QR code with a mobile phone and through analysis by the phone, the user can obtain the URL for the attachment upload page. The user can trigger this URL to open the attachment upload page. Thereafter, the user can use an operation on the attachment upload page to select an object (e.g., an image that was captured in real time with a mobile phone or an image that is stored in a local gallery of the mobile phone) and upload the object as a form attachment.

As shown by the above description, according to various embodiments of the present disclosure, the method, the web server, and the system provide several advantages.

In some embodiments, after scanning the information code on a browser via a smart terminal, the user (e.g., the smart terminal) can open an attachment upload page and directly upload smart terminal data as an attachment to a form without the PC terminal having to store the attachment or without requiring a user to perform an upload operation on the PC terminal. For example, a user is not required to first transfer a file from a smart terminal to a PC terminal and thereafter select the file from the PC terminal to upload the file. According to various embodiments of the present disclosure, user operations associated with uploading form data are thus simplified.

In some embodiments, security problems that result from local storage of attachments by the PC terminal are avoided. For example, the attachments can be uploaded directly from the smart terminal (e.g., the files to be uploaded can be selected from a local storage of the smart terminal). According to various embodiments of the present disclosure, security is thus improved.

In some embodiments, the server (e.g., the web server) uses security codes to exercise security control over the uploading of a form attachment. In this way, the server can prevent other users from subsequently scanning the information code and performing unauthorized uploads of form information. According to various embodiments of the present disclosure, security is thus further improved.

Various embodiments of the present disclosure do not burden the original form processing. Various embodiments of the present disclosure use an information code display and file information regeneration logic added to pages opened on the form. In some embodiments, such modifications (e.g., the information code display and file regeneration logic) can be easily implemented to use in applications.

Figure 6:
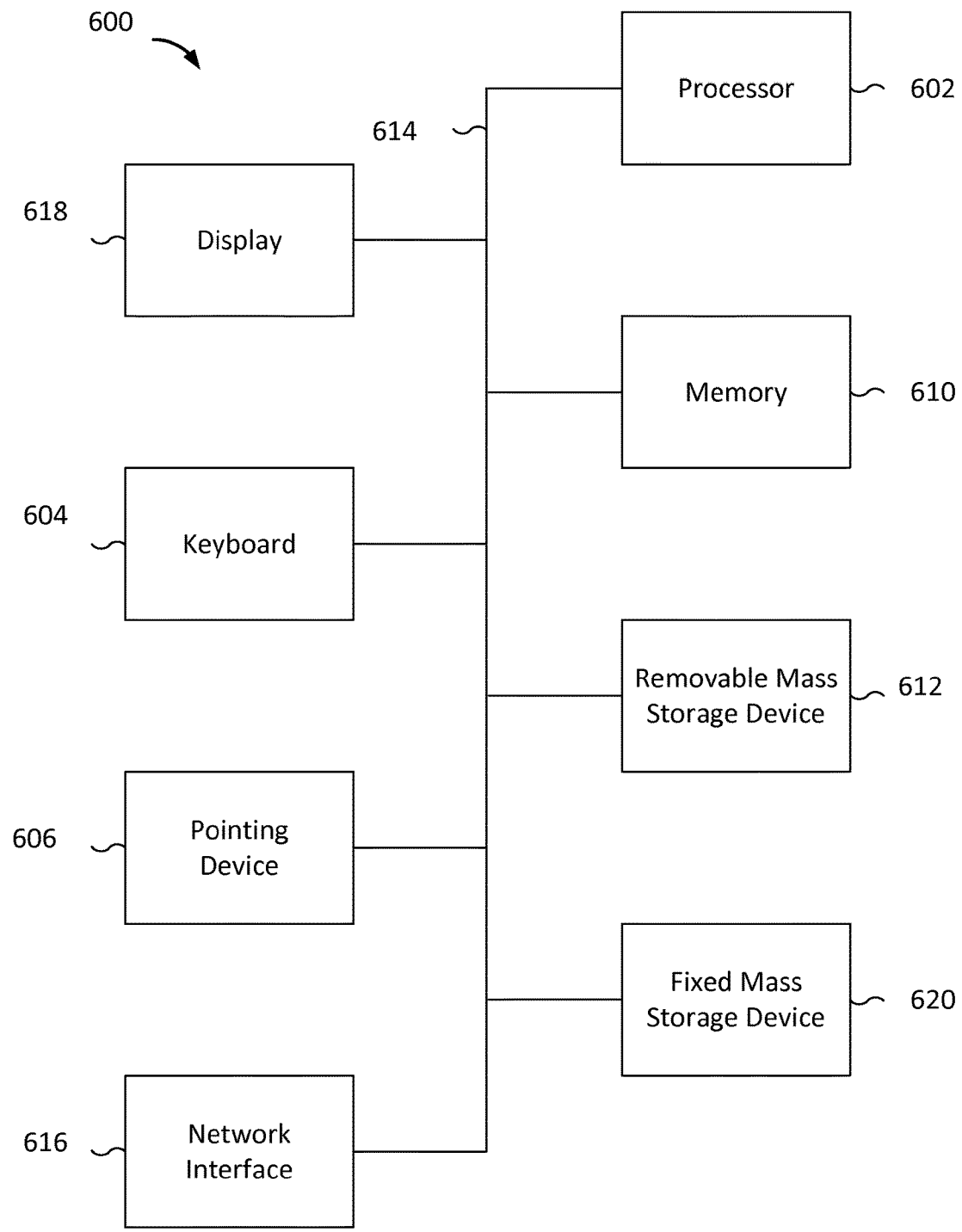
FIG. 6 is a functional diagram of a computer system for uploading a form attachment according to various embodiments of the present disclosure.

FIG. 6 is a functional diagram of a computer system for uploading a form attachment according to various embodiments of the present disclosure.

Referring to FIG. 6, a computer system 600 for accessing a website or for determining whether a terminal accessing the website is a mobile terminal is provided. As will be apparent, other computer system architectures and configurations can be used to implement video calls. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is merely an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The methods or process steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, from a second terminal, a request for an attachment upload address;
   in response to receiving the request for the attachment upload address, sending a form attachment upload address to the second terminal;

receiving, from a first terminal, an attachment upload page access request for requesting access to a page associated with the attachment upload address; and receiving a form attachment from the first terminal, the form attachment being an attachment related to the request for the attachment upload address made by the second terminal, wherein the form attachment corresponds to a file attachment to a form comprising form information that is submitted to a server.

2. The method of claim 1, wherein the first terminal is a mobile terminal.

3. The method of claim 1, wherein the form attachment is received from the first terminal via a submission to the page associated with the attachment upload address.

4. The method of claim 1, wherein the sending of the form attachment upload address to the second terminal comprises:
in response to receiving a form page access request from the second terminal, sending a form page and the form attachment upload address to the second terminal.

5. The method of claim 1, wherein the sending of the form attachment upload address to the second terminal comprises:
in response to receiving the request for the attachment upload address from the second terminal after the second terminal accesses a form page, sending the form attachment upload address to the second terminal.

6. The method of claim 1, wherein:
the sending of the form attachment upload address to the second terminal comprises generating an information code based at least in part on the form attachment upload address, and sending the information code to the second terminal.

7. The method of claim 6, wherein the sending of the form attachment upload address further comprises:
providing, by the second terminal, the information code to the first terminal;
acquiring, by the first terminal, the information code; and
extracting, by the first terminal, the form attachment from the information code.

8. The method of claim 1, wherein:
the request for the attachment upload address includes form-related information;
the form-related information is sent with an attachment upload page to the first terminal; and
the form attachment includes the form-related information.

9. The method of claim 8, further comprising:
storing an association between the form-related information and the form attachment.

10. The method claim 8, further comprising:
acquiring a security code that is associated with the form-related information after receiving the request for the attachment upload address sent by the second terminal and before sending the form attachment upload address to the second terminal;
acquiring a result of a validation of the security code in the event that the attachment upload page access request is received; and
in the event that the security code is validated, sending the form-related information mapped to the security code with the attachment upload page to the first terminal.

11. The method of claim 10, wherein the acquiring of the security code associated with the form-related information comprises:
sending the form-related information to an application server;
generating, by the application server, the security code;
associating, by the application server, the security code with the form-related information; and
receiving the security code from the application server.

12. The method of claim 11, wherein the acquiring the result of the validation of the security code comprises:
sending the security code included with the attachment upload page access request to the application server; and
receiving an indication of whether the security code is valid in response to the application server validating the security code included with the attachment upload page access request in comparison to the generated security code.

13. The method of claim 12, wherein validation of the security code comprises:
assessing whether the security code corresponds to an already created security code;
in the event that the security code corresponds to the already created security code, deeming the security code included with the attachment upload page access request to be valid; and
in the event that the security code does not correspond to the already created security code, deeming the security code included with the attachment upload page access request to be invalid.

14. The method of claim 12, wherein validation of the security code comprises:
assessing whether the security code corresponds to an already created security code and whether the security code is unused;
in the event that the security code corresponds to the already created security code and that the security code is unused, deeming the security code included with the attachment upload page access request to be valid; and
in the event that the security code does not correspond to the already created security code or that the security code is not unused, deeming the security code included with the attachment upload page access request to be invalid,
wherein the security code is recorded as used in the event that the security code is validated so as to be deemed valid.

15. The method of claim 8, further comprising:
receiving a file information regeneration request from the second terminal;
acquiring stored form attachment file information corresponding to form-related information included with the file information regeneration request; and
sending the file information to the second terminal so that the second terminal can use the file information to populate a current form.

16. The method of claim 15, wherein the second terminal sends the file information regeneration request using a polling method that includes:
polling and sending the file information regeneration request via JavaScript included in a form page; or
polling and sending the file information regeneration request via a plugin embedded in the form page; or
polling and sending the file information regeneration request by establishing a persistent connection with a web server.

17. The method of claim 1, further comprising:
in response to receiving the form attachment submitted by the first terminal, sending the form attachment to a file storage server.

18. The method of claim 1, wherein the form information is received from the second terminal, and the form attachment is received from the first terminal.

19. A web server comprising:
an interface module configured to exchange data with a second terminal and a first terminal;
a form page returning module configured to send a form attachment upload address to the second terminal via the interface module in response to the interface module receiving a request for an attachment upload address from the second terminal;
an upload page returning module configured to send an attachment upload page to the first terminal via the interface module in response to the interface module receiving an attachment upload page access request for requesting access to a page associated with the attachment upload address sent from the first terminal; and
a form processing module configured to store a form attachment in response to the interface module receiving the form attachment from the first terminal, wherein the form attachment corresponds to a file attachment to a form comprising form information that is submitted to a server.

20. The web server of claim 19, wherein the form page returning module is further configured to send a form page and the form attachment upload address to the second terminal.

21. The web server of claim 19, wherein the form page returning module is further configured to send the form attachment upload address to the second terminal in response to the interface module receiving the request for the attachment upload address from the second terminal after the second terminal access a form page.

22. The web server of claim 19, wherein the form page returning module is further configured to generate an information code based at least in part on the form attachment upload address, and to send the information code to the second terminal.

23. The web server of claim 22, wherein the information code is provided to the first terminal, which acquires the information code, and extracts the attachment upload address from the information code.

24. The web server of claim 19, wherein:
the request for the attachment upload address includes form-related information; and
the upload page returning module is further configured to send the form-related information with the attachment upload page to the first terminal.

25. The web server of claim 24, wherein the form processing module is further configured to store an association between the form-related information and the form attachment.

26. The web server of claim 24, wherein:
the form page returning module is further configured to acquire a security code that is associated with the form-related information; and
the upload page returning module is further configured to acquire a result of a validation of the security code in the event that the interface module receives the attachment upload page access request, and in the event that the security code is validated, to send the form-related information mapped to the security code with the attachment upload page to the first terminal.

27. The web server of claim 26, wherein the form page returning module is further configured to in the event that the security code associated with the form-related information is acquired, send the form-related information to an application server and to receive, from the application server, the security code, which is generated and associated with the form-related information by the application server.

28. The web server of claim 27, wherein the upload page returning module is further configured to send the security code included with the attachment upload page access request to the application server, and to receive an indication of whether the security code is valid in response to the application server validating the security code included with the attachment upload page access request in comparison to the generated security code.

29. The web server of claim 24, further comprising:
a file information acquiring module configured to acquire, in the event that the interface module receives a file information regeneration request from the second terminal, stored form attachment file information corresponding to the form-related information included with the file information regeneration request, and to send the file information via the interface module to the second terminal so that the second terminal can use the file information to populate a current form.

30. The web server of claim 19, wherein the form processing module is further configured to send the form attachment to a file storage server for storage in response to receiving the form attachment submitted by the first terminal.

31. A computer program product embodied in a tangible non-transitory computer-readable storage medium and comprising computer instructions for:
receiving a request for an attachment upload address from a second terminal;
sending a form attachment upload address to the second terminal in response to receiving the request for the attachment upload address from the second terminal;
receiving an attachment upload page access request for requesting access to a page associated with the attachment upload address sent from a first terminal;
sending page associated with attachment upload address to the first terminal in response to receiving the attachment upload page access request; and
receiving a form attachment from the first terminal, the form attachment being an attachment related to the request for the attachment upload address made by the second terminal, wherein the form attachment corresponds to a file attachment to a form comprising form information that is submitted to a server.

32. The computer program product of claim 31, wherein the computer instructions are further configured to:
acquire a security code that is associated with form-related information; and
acquire a result of a validation of the security code in the event that the attachment upload page access request is received, and in the event that the security code is validated, send the form-related information mapped to the security code with the attachment upload page to the first terminal.

33. The computer program product of claim 31, wherein the computer instructions are further configured to:
send the form attachment to a file storage server for storage in response to receiving the form attachment submitted by the first terminal.

34. The computer program product of claim 31, wherein the computer instructions are further configured to:
in response to receiving a file information regeneration request from the second terminal, acquire stored form attachment file information corresponding to form-related information included with the file information regeneration request; and send the file information to the second terminal so that the second terminal can use the file information to populate a current form.

* * * * *